United States Patent
Van Rens et al.

(10) Patent No.: US 10,673,144 B2
(45) Date of Patent: Jun. 2, 2020

(54) VERTICALLY-ORIENTED ANTENNA STRUCTURE FOR A TIMING SYSTEM

(71) Applicant: Mylaps B.V., Haarlem (NL)

(72) Inventors: Bas Jan Emile Van Rens, Heemstede (NL); Adriaan Klaas Verwoerd, Hoofddorp (NL)

(73) Assignee: MYLAPS B.V., Haarlem (NL)

( * ) Notice: Subject to any disclaimer, the term of this patent is extended or adjusted under 35 U.S.C. 154(b) by 144 days.

(21) Appl. No.: 15/427,730

(22) Filed: Feb. 8, 2017

(65) Prior Publication Data
US 2018/0226721 A1     Aug. 9, 2018

(51) Int. Cl.
| | |
|---|---|
| *H01Q 9/26* | (2006.01) |
| *H01Q 1/22* | (2006.01) |
| *H01Q 21/29* | (2006.01) |
| *G06K 7/00* | (2006.01) |
| *H01Q 9/04* | (2006.01) |

(Continued)

(52) U.S. Cl.
CPC ............... *H01Q 9/26* (2013.01); *G06K 7/006* (2013.01); *H01Q 1/2216* (2013.01); *H01Q 21/29* (2013.01); *A63B 71/0686* (2013.01); *G06K 19/0779* (2013.01); *H01Q 1/2208* (2013.01); *H01Q 1/244* (2013.01); *H01Q 9/0407* (2013.01)

(58) Field of Classification Search
CPC ........ H01Q 9/26; H01Q 21/29; H01Q 1/2216; H01Q 9/0407; H01Q 1/08; H01Q 1/1235; H01Q 1/084; H01Q 3/2623–2629; H01Q 1/2208; H01Q 1/244; G07C 1/22; G07C 1/24; G06K 7/006; G06K 9/00342; G06K 19/0779; A63B 71/0686
See application file for complete search history.

(56) References Cited

U.S. PATENT DOCUMENTS 8,373,548 B2    2/2013  Stewart et al.
2005/0168385 A1*  8/2005  Baker ................ G06K 7/10316
                                                343/700 MS (Continued)

FOREIGN PATENT DOCUMENTS

WO    2012072382 A1    6/2012

OTHER PUBLICATIONS

German Search Report dated Oct. 23, 2017 for corresponding with German Patent Application No. 202017100671.9, filed Oct. 23, 2017.

*Primary Examiner* — Ricardo I Magallanes
(74) *Attorney, Agent, or Firm* — Steven M. Koehler; Westman, Champlin & Koehler, P.A.

(57) ABSTRACT

A portable free-standing vertical RF antenna structure for use in an UHF timing system comprises a base structure for supporting the vertical antenna structure on a substantially horizontal surface. At least a first antenna unit comprising a first planar RF antenna and at least a second antenna unit comprising a second planar RF antenna, the second antenna unit being located above the first antenna unit, are coupled to the base structure and form a vertical RF antenna structure. The first and second antenna unit is positioned such that the inclination angle between a main axis of the radiation field of the first RF antenna and the horizontal surface is selected between 10 and 50 degrees. The inclination angle between a main axis of the radiation field of the second RF antenna and the horizontal surface is selected between −20 and 20 degrees.

20 Claims, 8 Drawing Sheets

(51) Int. Cl.
  *A63B 71/06* (2006.01)
  *G06K 19/077* (2006.01)
  *H01Q 1/24* (2006.01)

(56) References Cited

U.S. PATENT DOCUMENTS

| | | | |
|---|---|---|---|
| 2008/0136733 A1* | 6/2008 | DeRose | H01Q 1/12 |
| | | | 343/878 |
| 2010/0265801 A1* | 10/2010 | Ehelen | G07C 1/24 |
| | | | 368/9 |
| 2013/0300542 A1* | 11/2013 | Hansen | G07C 1/24 |
| | | | 340/10.1 |
| 2014/0062833 A1* | 3/2014 | Jian | H01Q 3/01 |
| | | | 343/882 |
| 2014/0104046 A1 | 4/2014 | Howell | |
| 2016/0268696 A1* | 9/2016 | Hosseini | G06K 7/0008 |
| 2016/0291148 A1* | 10/2016 | Ellenbogen | G01V 8/005 |

* cited by examiner

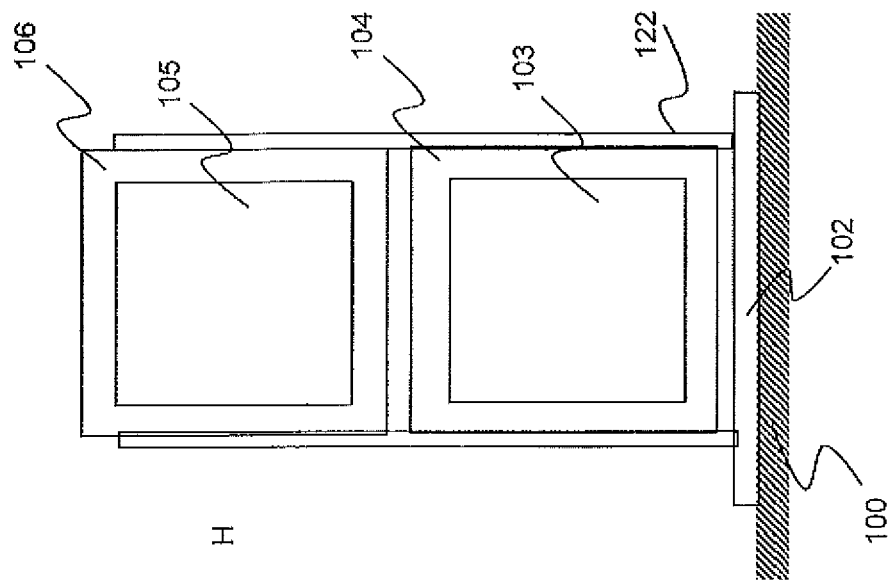
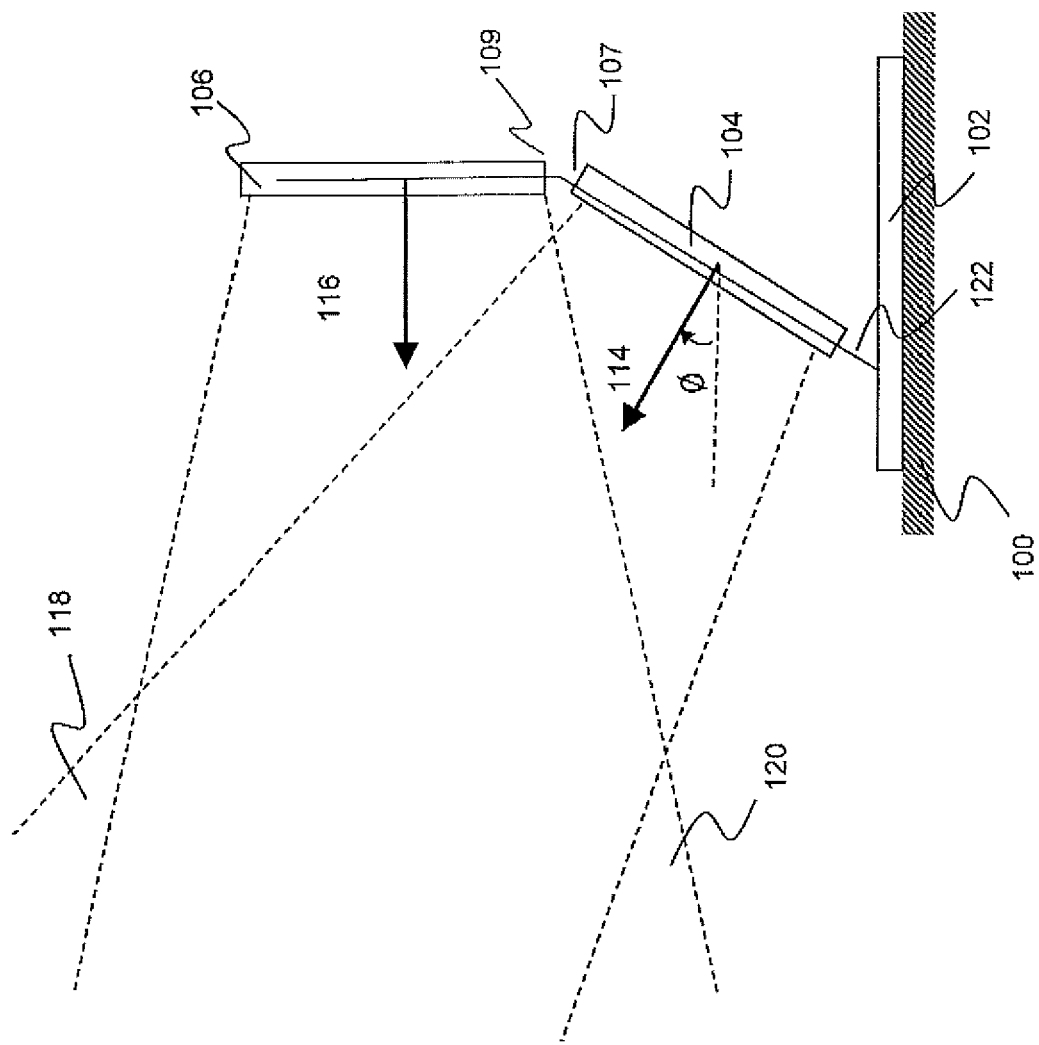
FIG. 1A
FIG. 1B

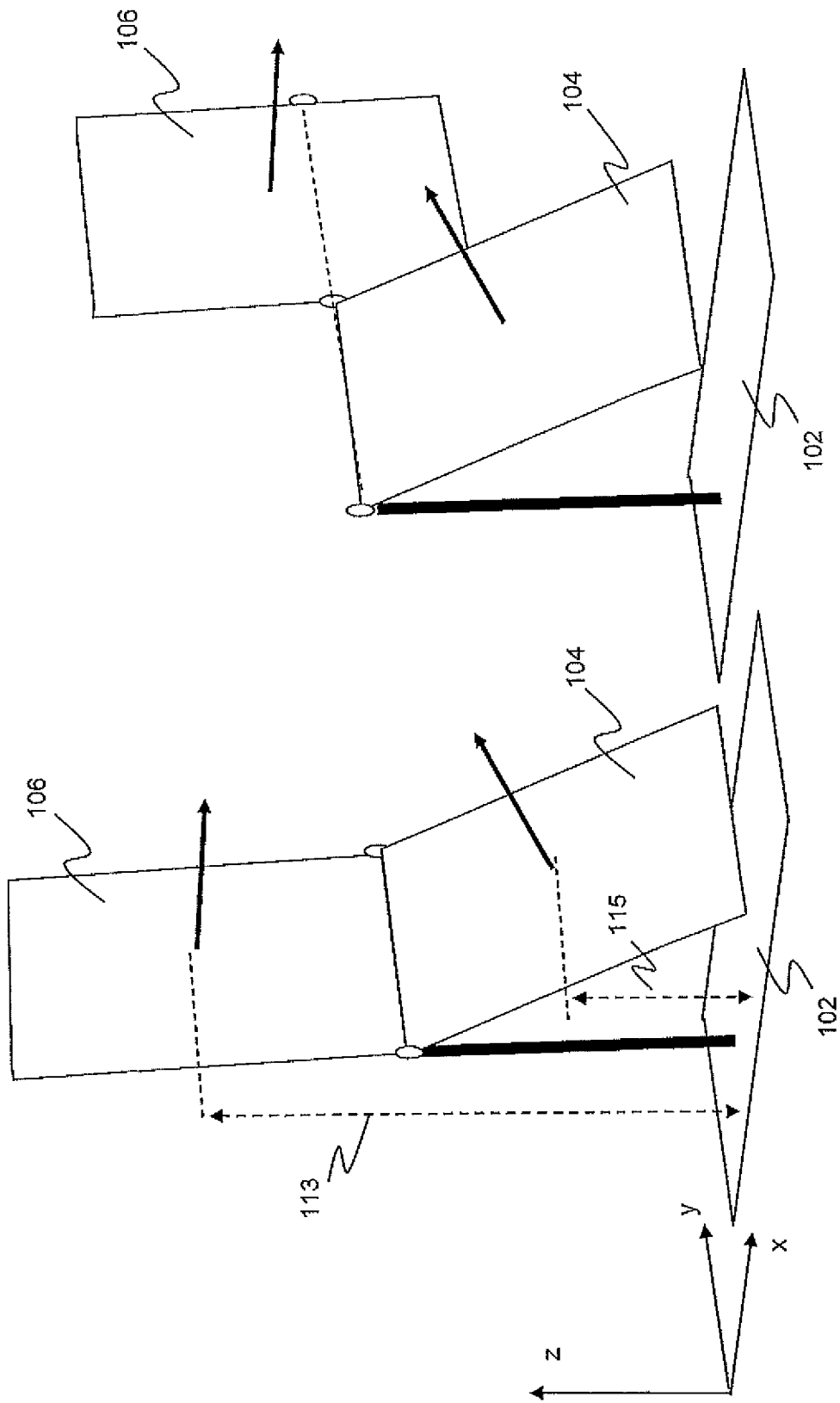

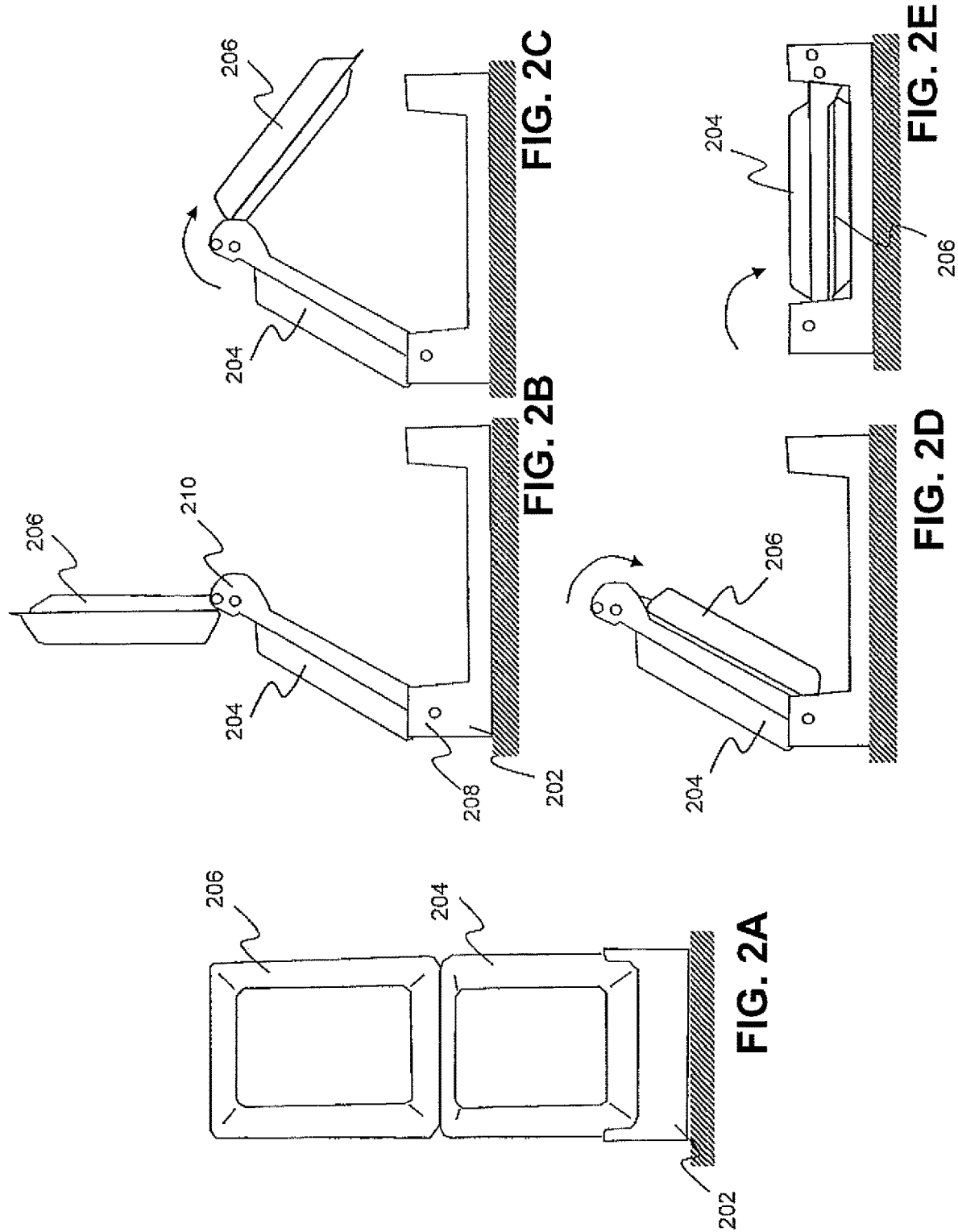

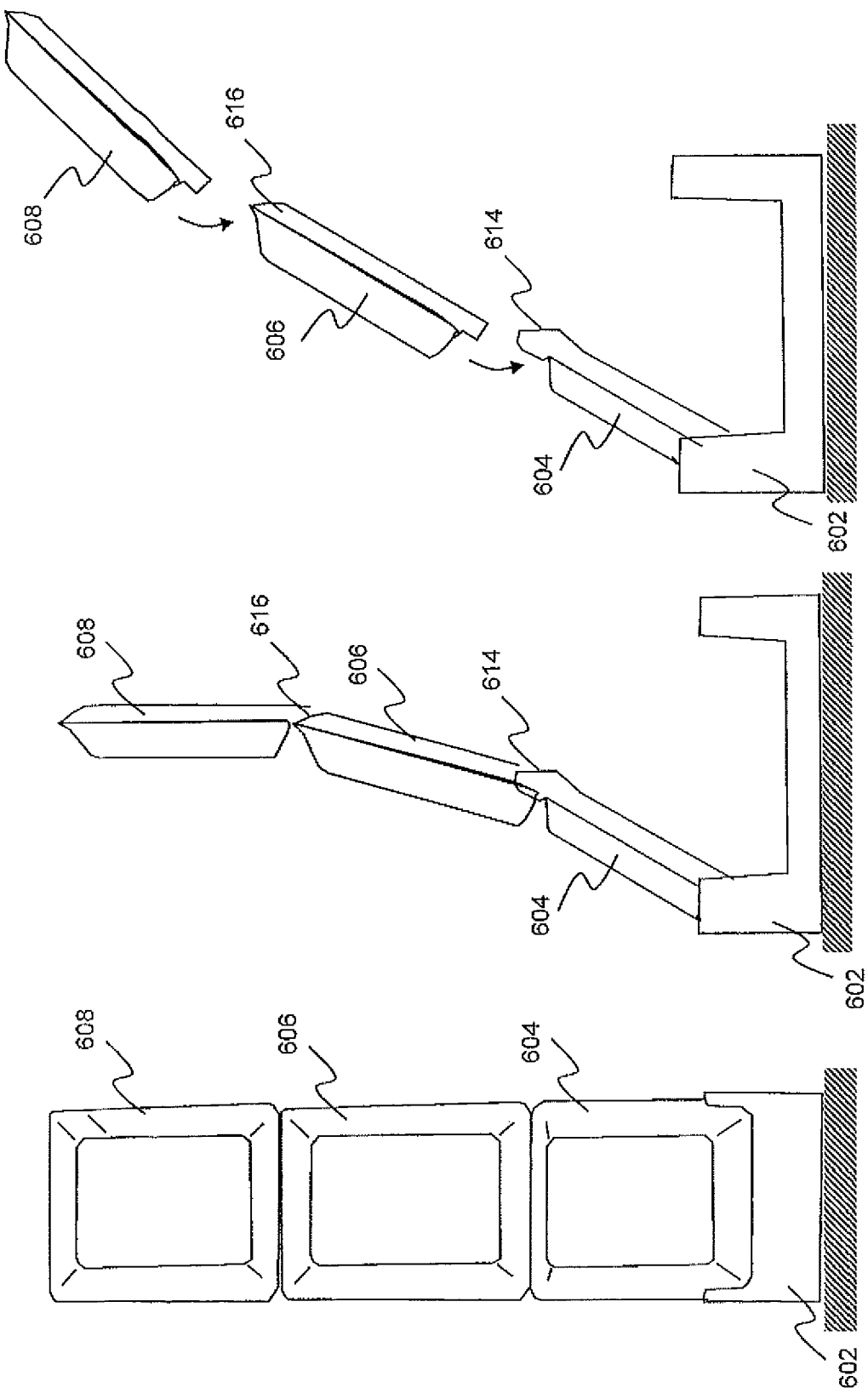

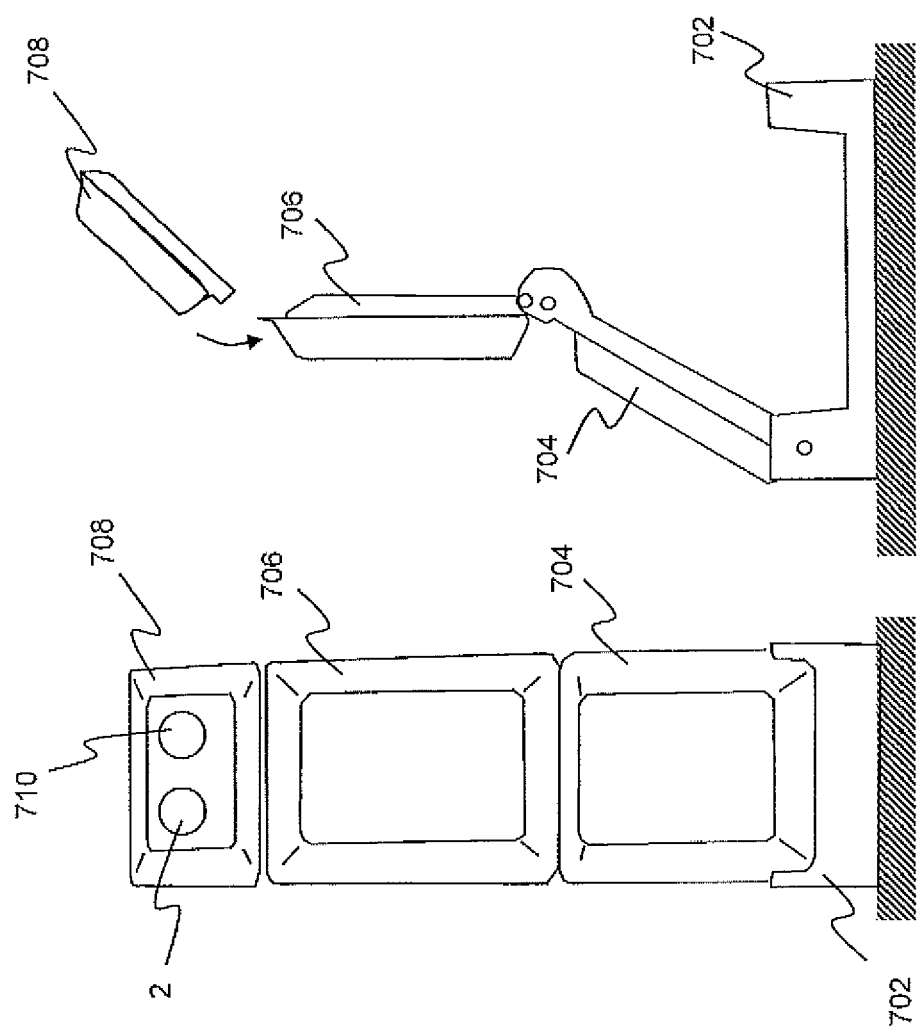

VERTICALLY-ORIENTED ANTENNA STRUCTURE FOR A TIMING SYSTEM

FIELD OF THE INVENTION

Aspects of the invention relate to a portable vertically-oriented antenna structure, and, in particular, though not exclusively, to a portable vertically-oriented antenna structures for a timing system and to a timing system using such vertically-oriented antenna structures.

BACKGROUND OF THE INVENTION

The discussion below is merely provided for general background information and is not intended to be used as an aid in determining the scope of the claimed subject matter.

Nowadays Ultra High Frequency (UHF) tags are commonly used in timing systems for large sports events e.g. mass sports events for running, cycling or motorcycling. UHF tags are cheap, low weight, and can be read fast and from relatively large distances. When a tag comes within the radiation field of the antenna mat, the tag starts sending out ID messages as a result of activation by the radiation field. The antennas in the mat receive these messages and transfer the messages to a decoder (an analyser). The decoder is connected to the antenna mat and is programmed to determine the passage time of the tag with a unique ID on the basis of the signal strength of the received messages. Because the electromagnetic field produced by the antenna in the mat is strongest above the center of the mat, it is possible to determine the point in time when the tag passes the antenna with reasonable accuracy.

Although the current state of the art mat-based timing systems provide highly reliable timing results with more than 99.9% up to 100% reliability for mass sports events, these mat-based timing system have some disadvantages. For example, installing the timing system requires putting the mat elements of a main mat and, possibly, one or more back up mats, in place and testing it. This process requires blocking the track for some time which may interfere with the organisation of the sports event. This is particular inconvenient in mass sports events such as a marathon or the like. Further, although a mat is modular and each mat element is made of a lightweight material, the total weight of the mat elements forming a full finish line may be substantial.

Further, when athletes pass the antenna mat they may step onto the mat, which may cause forces applied to the mat which may be considerable especially when large amounts of athletes cross the mat at once. These forces may influence the antenna performance due to detuning effects. Moreover, the forces may also induce friction between the mat elements which may influence the HF connection that connects the mat elements to the decoder. Additionally, in some sports like cycling the mats may hinder the athletes upon passing. In other sports the conditions are either not suitable for using a mat such as mud runs or ice skating.

Instead of a mat antenna, side antennas could be used in order to circumvent at least some of the above-mentioned problems. Timing systems using portable side antennas are known in the art. Such side antenna is typically configured as a flat RFID antenna connected to a tripod support structure, which fixates the antenna at a predetermined height from the ground. Such side antennas however have some disadvantages. For example, unlike the mat antenna configuration, in a side antenna configuration athletes may hinder the reading of other athletes. This is because signals in the UHF spectrum, e.g. between 0.8 and 2.4 GHz are easily absorbed or at least attenuated by the human body, in particular the torso. Hence, in a side antenna configuration, athletes located between the antenna and a passing athlete may hinder the activation and/or reading of the tag of the passing athlete, thus leading to errors in detecting passing athletes.

Furthermore, in timing systems the antennas of the RF antenna structures require accurate positioning with respect to the track in order ensure high reading rates, or at least reading rates that match the specifications of the timing system. In contrast to mat antennas (in which the alignment and positioning of the antenna elements can be easily controlled by sideway alignment of the mat elements) aligning and positioning side antennas in such a way that the read rate is optimal is more difficult. The side antennas need to be positioned and configured such that a radiation field of sufficient dimensions and power is generated across a track. For these reasons, up till now, timing systems based on side antenna's that are suitable for timing mass events with a reliability that match the current state of the art mat-based did not exist.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

In an aspect, the invention relates to a portable free-standing vertically-oriented RF antenna structure for use in an UHF timing system comprising: a base structure for supporting at least a first and second vertically-oriented antenna unit on a substantially horizontal surface; the first vertically-oriented antenna unit comprising a first planar RF antenna and the second vertically-oriented antenna unit comprising a second planar RF antenna, the first and second antenna unit being connected to the base structure; wherein a first inclination angle between a main axis of a first radiation field of the first RF antenna and the horizontal surface is selected between 10 and 50 degrees, preferably 20 and 40 degrees; and a second inclination angle between a main axis of the second radiation field of the second RF antenna and the horizontal surface is selected between −20 and 20 degrees, preferably −10 and 10 degrees.

The selected first inclination angles provide the effect that the main axis of the generated first radiation field is pointing in an upward direction towards the center line of the track. This way, when the first antenna unit is positioned at a first height relatively close the support surface, tags of participants that are passing the side antenna relatively close by will be activated by the radiation field. The selected second inclination angle provides the effect that a radiation field is generated having a main axis that is substantially parallel to the horizontal surface of the support surface and directed towards the center of the track. This way, tags of participants that are passing the side antenna relatively far away will be activated by the radiation field. A substantial part of the radiation field may pass through a lower part (the legs) of participants that pass the side antenna relatively close by.

Hence, the combination of a first antenna unit that is oriented such that the radiation field triggers tags of athletes that pass the side antenna relatively close by and a second antenna unit that is oriented such that the radiation field triggers tags of athletes that pass the side antenna relatively far away.

In an embodiment, the second antenna unit may be positioned above the first antenna unit. In an embodiment, the bottom edge of the second antenna unit may be positioned close to the top edge of the first antenna unit. In an embodiment, a frame connected to the base structure may be used to position the second antenna unit above the first antenna unit.

In an embodiment, the second antenna unit may be positioned next to the first antenna unit. In an embodiment, a frame connected to the base structure may be used to position the first antenna unit next to the second antenna unit.

In an embodiment, the main axis of the radiation field of the first RF antenna may be normal to the surface of the first RF antenna. In an embodiment, the main axis of the radiation field of the second RF antenna may be normal to the surface of the second RF antenna In an embodiment, the first second planar RF antenna and/or second planar RF antenna comprises at least one patch antenna, preferably a linear polarized patch antenna, more preferably a linear polarized butterfly and/or tie-bow shaped patch antenna, the patch antenna being configured to resonate at least a frequency selected between 870 and 930 MHz and/or comprise a metal ground plane.

In an embodiment, the first and second antenna unit may have a substantially rectangular shape. In an embodiment, the length of the first and/or second antenna unit may be selected between 30 and 60 cm. In an embodiment, the width of the first and/or second planar RF antenna may be selected between 20 and 50 cm. In an embodiment, the height of the the vertically-oriented RF antenna structure may be selected between 60 and 120 cm.

In an embodiment, the first and second antenna unit may be arranged to form a foldable RF antenna structure, the foldable RF antenna structure comprising a folded antenna configuration and an unfolded vertical antenna configuration.

In an embodiment, the base structure may be arranged to form a housing structure for housing the first and second antenna unit in the folded antenna configuration.

In an embodiment, the first planar antenna unit may be pivotable connected to the base structure by a first pivotable connection. In an embodiment, the first planar antenna unit may be further pivotable connected to the second planar antenna unit by a second pivotable connection.

In an embodiment, the first and second pivotable connection may be adapted to position the first and second planar antenna unit in the folded antenna configuration and in the unfolded antenna configuration respectively; wherein in the folded antenna configuration a first planar surface of the first RF antenna faces a first planar surface of the second RF antenna.

In an embodiment, the first and second antenna unit may be arranged to form a modular RF antenna structure, the modular RF antenna structure comprising an assembled configuration and a disassembled configuration, the base structure being arranged to form a housing structure for housing the first and second antenna unit in the disassembled antenna configuration.

In an embodiment, the first and second antenna unit may comprise connecting members adapted to fixate the first antenna unit to the base structure and to fixate the second antenna unit to the first antenna unit.

In an embodiment, the RF antenna structure may further comprise one or more camera units; and/or, one or more display units; and/or, a GPS unit.

In yet a further aspect, the invention may relate to a portable foldable RF antenna structure for use in an UHF timing system, the foldable RF antenna structure arranged to be in a folded antenna configuration and an unfolded vertically-oriented antenna configuration, the structure comprising: a base structure arranged to support the unfolded vertically-oriented antenna configuration on a substantially horizontal surface; the vertically-oriented antenna configuration comprising at least a first and a second planar antenna unit, the first and second planar antenna unit being vertically oriented with respected to the horizontal surface; the base structure further being arranged as a housing for housing the first planar antenna unit and the second planar antenna unit in the folded antenna configuration.

In an embodiment, the first planar antenna unit may be pivotable connected to the base structure by a first pivotable connection. In an embodiment, the first planar antenna unit may be further pivotable connected to the second planar antenna unit by a second pivotable connection; the first and second pivotable connection being adapted to position the first and second planar antenna unit in the folded antenna configuration and in the unfolded antenna configuration respectively.

In an embodiment, the folded antenna configuration may include the first planar surface of the first RF antenna facing a first planar surface of the second RF antenna. In an embodiment, in the unfolded antenna configuration, a main axis of the first RF antenna may be arranged to make a first inclination angle with the horizontal surface. In an embodiment, a main axis of the second RF antenna may be arranged to make a second inclination angle with the horizontal surface. In an embodiment, the first inclination angle may be selected between 10 and 50 degrees, preferably 20 and 40 degrees. In an embodiment, the second inclination may be selected between −20 and 20 degrees, preferably −10 and 10 degrees.

In a further aspect, the sports timing system may comprise a decoder system connected to a plurality of portable free-standing vertically-oriented RF antenna structures, including: a first portable free-standing vertically-oriented RF antenna structure comprising at least a first antenna unit, the first antenna unit comprising a first planar RF antenna;

a second portable free-standing vertically-oriented RF antenna structure comprising at least a second antenna unit, the second antenna unit comprising a second planar RF antenna;

wherein a first inclination angle between a main axis of a first radiation field of the first RF antenna and a horizontal surface on which the first vertically-oriented RF antenna structure is standing, is selected between 10 and 50 degrees, preferably 20 and 40 degrees; and, a second inclination angle between a main axis of a second radiation field of the second RF antenna and a horizontal surface on which the second vertically-oriented RF antenna structure is standing, is selected between −20 and 20 degrees, preferably −10 and 10 degrees.

In an embodiment, the first and second free-standing vertically-oriented RF antenna structure may be positioned at one side of a sports track, the main axis of the radiation field of the first and second portable free-standing vertically-oriented RF antenna structures pointing towards the center line of the sports track.

In an embodiment, each of the plurality of portable free-standing vertically-oriented RF antenna structures may comprise an GPS unit, the decoder system being configured to determine the position of the position of each portable free-standing vertically-oriented RF antenna structures; and, optionally, to display the positions of the portable free-standing vertically-oriented RF antenna structures to a user using a graphical user interface.

In yet a further aspect, the invention may be related to a sports timing system comprising at least one decoder system connected to one or more portable free-standing vertically-oriented RF antenna structures as described above.

Aspects of the invention will be further illustrated with reference to the attached drawings, which schematically will show various embodiments. It will be understood that the invention is not in any way restricted to these specific embodiments.

BRIEF DESCRIPTION OF THE DRAWINGS

FIG. 1A-1D schematically depict a portable RF antenna structure according to an embodiment of the invention.

FIG. 2A-2E schematically depict a portable RF antenna structure according to an embodiment of the invention;

FIG. 6A-6C schematically depicts a portable RF antenna structure according to another embodiment of the invention;

FIGS. 7A and 7B schematically depicts a portable RF antenna structure according to a further embodiment of the invention.

DETAILED DESCRIPTION

Figure 3B:
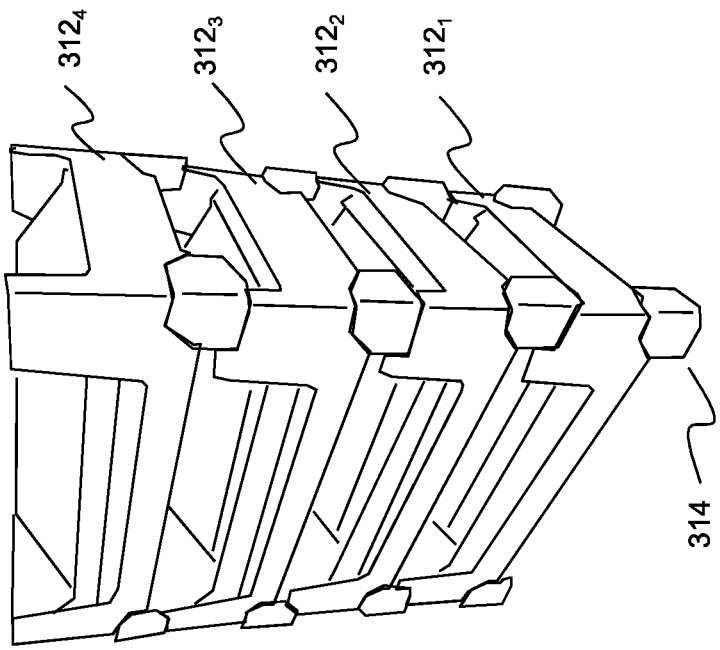
FIG. 3A-3B schematically depicts a portable RF antenna structure according to an embodiment of the invention.

FIG. 1A-1D schematically depict vertically-oriented RF antenna structures according to various embodiments of the invention. These structures are configured for use in UHF timing systems which are used in mass sports events. In this application, the term vertically-oriented antenna structure refers to antenna structures that include planar RF antennas that generate radiation fields in a side direction. When positioning such vertically-orientated RF antenna at a side of a sports track and orienting the main axis of the radiation field towards the track, a radiation field can be generated that traverses the full width of the track and that has a maximum field strength at a height at which participants wearing tags pass the measuring point (e.g. breast height).

FIGS. 1A and 1B schematically depict a cross-section and a front-side of a portable free-standing vertically-oriented antenna RF antenna structure comprising a base structure 102 for keeping a vertical arrangement of at least a first planar antenna unit 104 and a second planar antenna unit 106 in an upright and substantially vertical orientation. The base structure may be positioned on a substantially horizontal support surface 100 (the ground). The antenna units may comprise one or more planar RF antennas 103,105, typically one or more planar patch antennas, that are configured to generate a directional radiation field 118,120, wherein the main axis 114,116 of the radiation field may be normal to the surface of the planar RF antenna 104,106. Hence, by tilting the plane of the RF antenna (or the planar antenna unit), the direction in which the main axis 114,116 of the radiation field 118,120 is pointing may be changed.

Typically, an antenna unit may have a rectangular shape. The dimensions of the antenna units 104,106 may include a width selected between 20 and 50 cm and a length selected between 30 and 60 cm. Further, the height of the vertically-oriented RF antenna structure including the base structure 102 (measured from the support surface up to the top of the second antenna unit) may be approximately between 60 and 120 cm.

One or more portable free-standing vertical RF antenna structures as shown in FIGS. 1A and 1B may be placed along the side of a track that is used for a sports event, preferably a mass sports event such as a running or cycling, and connected to a decoder. Participants of a sports event may comprise an UHF tag, typically a passive UHF tag, (e.g. a bib tag or a tag connected to the steering plate of a motorcycle) and if participants are within the radiation field of the one or more antennas, the tags are activated and the antennas will pick up backscattered signals which are sent by the activated tags to the antennas. The backscattered signal may be modulated so that it can carry digital information e.g. an identifier.

Typical frequencies used by the timing system are in het UHF spectrum, e.g. between 0.8 and 2.4 GHz. Signals at such frequencies are easily absorbed by the human body, in particular the torso. Hence, in a typical side antenna configuration as described above, athletes located between the antenna and a passing athlete may hinder the activation and/or reading of the tag of the passing athlete, which will lead to errors in detecting passing athletes.

For that reason, conventional vertical side antennas are not suitable for mass sports events in which a large number tags worn by athletes simultaneously or almost simultaneously pass a time measuring point (e.g. a finish). In such situation, conventional vertical side antennas cannot provide a high read rate. Therefore, portable timing systems that require very reading rates of around 100% typically use a modular mat antenna known in the prior art.

In order to solve this problem, the first antenna unit 104 of the vertical antenna structure be oriented such that the main axis 114 of the radiation field 118 of the first RF antenna 104 is tilted with respect to support surface 100 on which the base 102 is placed. The tile or inclination is selected such that the main axis 114 of the radiation field 118 points upwards in accordance with an inclination angle φ, which is defined as the angle between the main axis 114 of the radiation field 118 of the first RF antenna and the horizontal surface 100 of the support surface.

A first inclination angle of the first antenna unit 104 may be selected between 10 and 50 degrees. In a further embodiment, the first inclination angle of the first antenna 104 may be selected between 20 and 40 degrees, preferably around 30 degrees. The selected inclination angle provides the effect that the main axis 114 of the generated radiation field 118 is pointing in an upward direction towards the center line of the track. This way, when the first antenna unit 104 is positioned at a first height relatively close the support surface, tags of participants that are passing the side antenna relatively close by will be activated by the radiation field 118.

Further, the second planar antenna unit 106 may be positioned at a second height with respect to the support surface (preferably higher than the position of the first planar antenna unit). A second inclination angle of the second antenna unit 106 may be selected between −20 and 20 degrees, preferably −10 and 10 degrees. The selected second inclination angle provides the effect that a radiation field 120 is generated having a main axis 116 that is substantially parallel to the horizontal surface 100 of the support surface and directed towards the center of the track. This way, tags of participants that are passing the side antenna relatively far away will be activated by the radiation field 120. A substantial part of the radiation field 120 may pass through a lower part (the legs) of participants that pass the side antenna relatively close by.

Hence, the combination of a first antenna unit 104 that is oriented such that the radiation field 118 triggers tags of athletes that pass the side antenna relatively close by and a second antenna unit 106 that is oriented such that the radiation field 120 triggers tags of athletes that pass the side antenna relatively far away.

In an embodiment, the first and second antennas 104,106 may be positioned at different height, a first height and a second height. In an embodiment, the second antenna unit 106 may be placed above the first antenna 104. In an embodiment, the bottom edge 109 of the second antenna unit 106 may be positioned close to (or connected to) the top edge 107 of the first antenna unit 104. This way, the second antenna unit 106 does not interfere with the radiation field 118 of the tilted first antenna unit 104. The antenna units 104,106 and the planar RF antennas in the antenna units may have a rectangular shape.

In an embodiment, the first and second antenna unit 104,106 may be held in position using a frame structure 122. In another embodiment, the vertical antenna structure may have a frameless structure. In that case, the planar antenna units 104,106 may be configured as an antenna housing comprising a planar RF antenna, wherein the antenna housing comprises a rigid mechanical structure. The bottom edge of the first antenna unit may be connected to the base structure and the top edge of the first planar antenna unit may be connected to the bottom edge of the second planar antenna unit.

A first antenna unit 104 arranged in a tilted vertical position at a first height in combination with a second antenna unit 106 arranged at a second height that is higher than the first height provides a portable freestanding vertically-oriented RF antenna structure that is suitable for a timing system that requires very high read rates.

The decoder will sequentially drive the first and second antenna units 104,106 so that the tags of the passing at athletes are exposed to differently oriented radiation fields 118,120 in order to maximize the chance that during the passing of many athletes simultaneously each tag is activated. This way, substantially all tags of a group athletes that pass a timing line of a track may be activated and the backscattered signals may be detected by the decoder connected to the antenna structure. The antennas 104,106 are driven sequentially in order to avoid interference effects between the radiation fields 118,120 of the first and second antenna units 104,106.

For example, when using two vertical antenna structures as shown in FIGS. 1A and 1B connected to a decoder, read rates from 99.4 to 100% were obtained for passing densities from 90 up to 300 athletes per minutes at a frequency between 870-930 MHz. In this experimental setup a directional patch antenna design was used which is discussed hereunder which reference to FIGS. 3A-3B.

FIGS. 1C and 1D depicts examples of different structural arrangements of antenna units 104,106 that provide the envisaged effects as described above. FIG. 1C depicts a structure as described with reference to FIGS. 1A and 1B including a tilted vertical oriented first antenna unit 104 mounted to a base structure 102 and positioned at a first height 115 close to the support surface and a vertical oriented second antenna 106 mounted to a base structure and positioned at a second height 113 above the first antenna unit 104. FIG. 1D depicts an alternative arrangement wherein the first and second antenna units 104,106 are arranged next to each other. The first and second antenna units 104,106 may be oriented in the same way as described above with reference to FIGS. 1A and 1B. In further embodiments, each antenna unit 104,106 may be mounted on a separate base structure 102.

Aspects of the invention thus enables the realization of a timing system that used side antennas that are suitable for timing mass events with a reliability that match the current state of the art mat-based timing systems.

FIG. 2A-2E schematically depict a portable RF antenna structure according to another embodiment of the invention. In particular, FIG. 2A-2E depicts a foldable RF antenna structure which has an unfolded configuration (FIGS. 2A and 2B) and a folded configuration (FIG. 2E). In the unfolded configuration, the RF antenna structure may represent a free-standing vertically-oriented RF antenna structure comprising at least two antenna units 204,206 that may be similar to the antenna structure described with reference to FIG. 1A-1B. In the folded configuration as shown in FIG. 2E, the antenna units 204,206 may form a stacked assembly. The stacked assembly may include a planar surface of the first antenna unit 204 faces a planar surface of the second antenna unit 206. In an embodiment, the base 202 may be configured as a housing structure for housing the stacked assembly of antenna units 204,206.

The foldable RF antenna structure comprises a base structure 220 for holding the antenna device in a vertical position on the support surface. The first and second antenna unit 204,206 may comprise a first and second planar RF antenna respectively. The first antenna unit 204 may be pivotable connected to the support by a first pivotable connection 208. Similarly, the first antenna unit 204 may be pivotable connected to the second antenna unit 206 by a second pivotable connection 210. In an embodiment, the first antenna unit 204 may be pivotable connected to the base structure 220 and the second antenna unit 206 using a pivotable frame. In another embodiment, the foldable RF antenna structure may comprise a frameless structure in which the bottom edge of the first antenna unit 204 may be pivotable connected to the base structure 220 and/or in which the top edge of the first antenna unit 204 may be pivotable connected to the bottom edge of the second antenna unit 206.

In an embodiment, the antenna units 204,206 may be configured as an antenna housing comprising a RF antenna. In an embodiment, the RF antenna may be configured as a (planar) RF antenna including one or more patch antennas, one or more slot antennas or one or more yagi antennas.

The first and second pivotable connection may be adapted to position the first and second antenna units 204,206 in a folded (horizontally stacked) configuration as shown in FIG. 2E and to position the first and second antenna units 204,206 in an unfolded (vertically stacked) configuration as shown in FIG. 2A (front face) and FIG. 2B (side face).

In the unfolded configuration, the antenna may be used as a side antenna of an UHF timing system. The inclination angle of the first antenna unit 204 and the second antenna unit 206 may be set such that the radiation patterns of the RF antennas provide very high read rates of passing participants which have a tag attached to their shirt at breast height or a tag attached to a vehicle, e.g. a motorcycle.

In the folded configuration, the antenna structure forms a compact portable structure that can be easily transported and handled. The process of folding may be achieved by pivoting the second antenna unit 206 towards the first antenna unit 204 (FIG. 2C) until a first planar surface of the first antenna unit 204 faces a first planar surface of the second antenna unit 206 (FIG. 2D) so that the first and second antenna units 204,206 form a horizontally stacked assembly. Thereafter, the folded first and second antenna units 204,206 may be folded onto the base 202 (FIG. 2E).

In an embodiment, the support may be configured as a housing structure configured to house the folded first and second RF antenna units. This way, the antenna units may be protected during transport. Further, the housing may be configured so that a plurality of portable RF antenna structures in folded configuration can be stacked on top of each other.

As shown in FIG. 2A-2E, the foldable vertical RF antenna structure provides an easy to install and highly portable antenna structure for a timing system that requires high read rates.

Figure 3A:
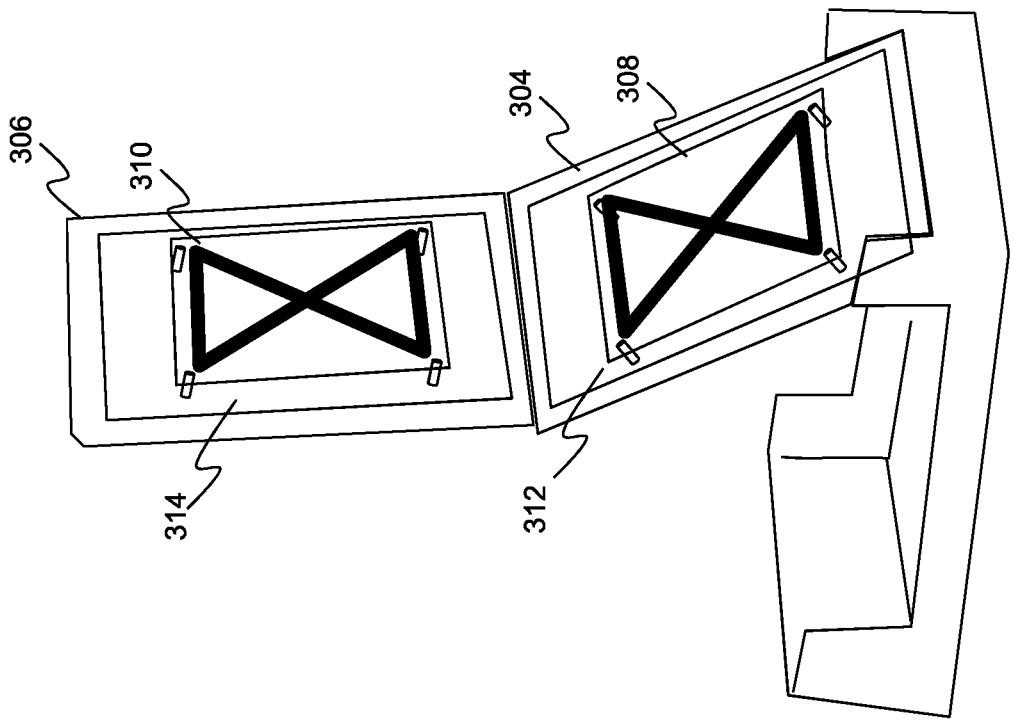

FIGS. 3A and 3B schematically depicts RF antenna structures according to various embodiments of the invention. In particular, FIG. 3A depicts a RF antenna structure wherein the housing of the antenna units 304,306 is left away for clarity so that the planar RF antennas of the antenna units 304,306 are visible. As shown in FIG. 3A, each antenna unit 304,306 may comprise at least one planar patch antenna structure. The patch antenna structure may include a PCB board 308,310 including one or more metal antenna structures. In a preferred embodiment, the metal antenna structure may include a butterfly antenna structure which is optimized for the frequency range between 870 and 930 MHz. In embodiment, the dimensions of the metal antenna structure may be approx. 200-300 mm in length and 100-200 mm in width. The radiation field generated by butterfly antenna structure is linear polarized.

A metal layer 312,314 behind the PCB board 308,310 may act as ground plane and reflector in order to improve the directionally of the radiation field of the patch antenna 304,306. It has been experimentally shown that the antenna design shown in FIG. 3A provides excellent directionality of the radiation field and coupling of the radiation field to tags of passing participants.

FIG. 3B depicts a stacked arrangement of foldable RF antenna structures $312_{1-4}$ in the folded state wherein the base structure of the foldable RF structure $312_{1-4}$ may be configured as a housing for the folded antenna units. In an embodiment, the housing may include stacking elements 314 connected to the base structures wherein the stacking elements enable vertical stacking of a plurality foldable RF antenna structures $312_{1-4}$ in a folded state.

Figure 4:
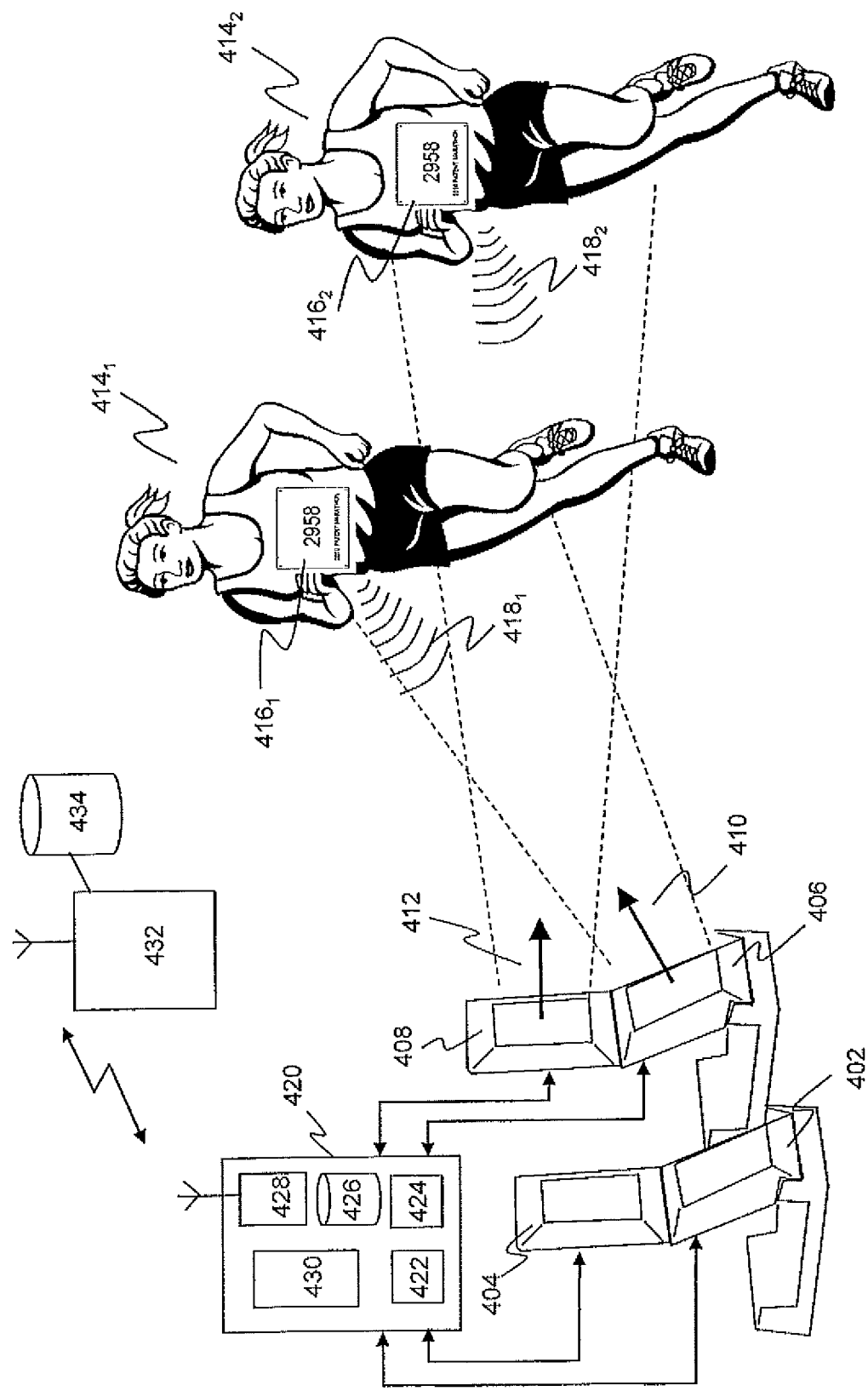
FIG. 4 schematically depicts a timing system using portable RF side antenna structures according to an embodiment of the invention.

FIG. 4 schematically depicts a timing system using vertically-oriented RF antenna structures according to an embodiment of the invention. In particular, FIG. 4 depicts first and second antenna units 402,404 of a first portable RF antenna structure and first and second antenna units 406,408 of a second portable RF antenna structure connected to a decoder system 420. The decoder system 420 may be configured as a portable box or the like. Alternatively, in an embodiment, the decoder system 420 may be integrated with one of the portable RF antenna structures. For example, the decoder system 420 may be integrated in the base structure of a portable RF antenna structure.

A transceiver 422 in the decoder system 420 may configured to sequentially drive the antennas 402,404,406,408 of the first and second RF antenna structures. This way, each RF antenna 402,404,406,408 sequentially generates a modulated electromagnetic radiation field (e.g. first and second radiation fields 410,412 having a first and second main axis) wherein the direction of the main axis of the radiation field is perpendicular to the direction of the track of the sporting event on which a plurality of athletes $414_{1,2}$ wearing a tag $416_{1,2}$, in this example a bib tag, pass the portable vertically-oriented antenna structures.

A tag $416_{1,2}$ may comprise a dipole antenna connect to a chip comprising a processor for generating a modulated backscatter signal in response to a modulated signal of an RF antenna. The unfolded length of the tag antenna may be approximately half the wavelength of the operation frequency, e.g. between 10-20 cm (900 MHz equals approximately 16 cm). The may be securely attached to support sheet forming the bib.

Hence, when the tag $416_{1,2}$ enters the modulated radiation field 410,412, the tag $416_{1,2}$ may be activated and start transmitting information, e.g. a tag ID stored in a memory 426 of the tag $416_{1,2}$, in the form of a modulated backscattered signal $418_{1,2}$, back to the detection antennas. The tag $416_{1,2}$ may continue sending messages as long as the tag $416_{1,2}$ is in the radiation field of one of the antennas 402,404,406,408.

The transceiver 422 may receive one or more messages that are picked up by one or more antennas 402,404,406, 408, time-stamp the received messages, determine the signal strength e.g. the RSSI, of the received messages and transform the signals into digital information. These data are subsequently processed by a data processor 424. The electro-magnetic field produced by the antennas 402,404,406, 408 is the strongest in the direction of the main axis of the radiation field produced by the antennas 402,404,406,408. A data processor 424 in the decoder may execute an algorithm which may determine a passing time of a tag $416_{1,2}$ on the basis of the received time-stamped messages and the signal strength of the received messages. The time associated with the strongest signal strength of a tag (identified by a tag ID) may be interpreted as the passing time. The passing time and the tag ID may be subsequently stored in in the memory for further use.

As shown in FIG. 4 due to the orientations (both in height and/or inclination) of the antenna units 406,408 of each vertically-oriented RF antenna structure, at least a first radiation field 410 of an antenna unit 406 is controlled to activate tags of athletes $414_1$ that are close to the side antennas and a radiation field 412 of an antenna unit 408 is controlled to activate tags of athletes $414_2$ that are relatively far away from the side antennas.

The decoder system 420 or at least one of the RF antenna structures may further comprise a GPS unit so that the location of the timing system or the antenna structure is known. Further, the decoder system 420 may comprise a wireless interface 428, e.g. WiFi or an LTE wireless connection, so that the measured data can be transmitted to a central server 432 which is configured to process the data and store the date in a central database 434. The decoder system 420 may further comprise a (graphical) user interface 430.

Figure 5:
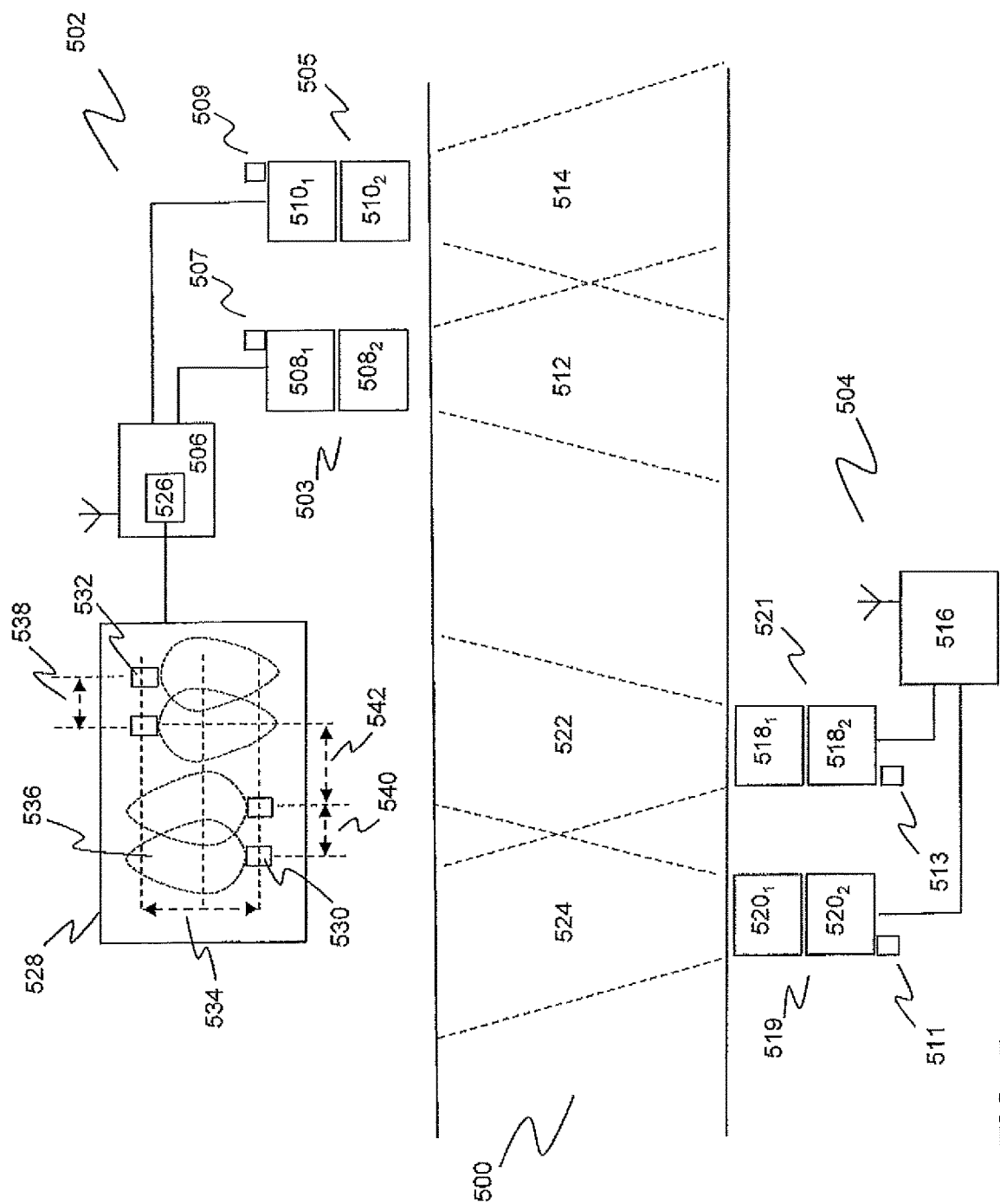
FIG. 5 schematically depicts a timing system using portable RF side antenna structures according to another embodiment of the invention.

FIG. 5 schematically depicts a timing system using portable foldable RF antenna according to another embodiment of the invention. In particular, FIG. 5 depicts a track 500 of a predetermined with e.g. 4-12 meters (preferably approx. 8 meter) width comprising two timing systems 502,504, a first (main) timing system 502 comprising a first decoder system 506 connected to at least a first and second portable vertically-oriented antenna structure 503,505, each comprising at least a first and second antenna unit $508_{1,2}, 510_{1,2}$ that are located at a first side on the track (approx. one meter distance between them).

Further, a second (backup) timing system comprising a second decoder system 516 connected at least a first and second portable vertically-oriented antenna antenna structure 519,521, each comprising at least a first and second antenna unit $518_{1,2}$, $520_{1,2}$ located at the other (second) side of the track. The portable antenna structures may be located at the other side of the track, at a predetermined distance (e.g. least 3 meters) from the portable antenna structures of the first timing system. This way it is ensured that no interference will take place between the radiation fields 512,514,522,524 of the antennas of the first and second timing system. The backup timing system may ensure that participants that are missed by the main timing system can be detected by the backup timing system. This configuration maximizes the read rate of the tags.

In an embodiment, each portable vertically-oriented antenna structure may comprise an GPS unit 507,509,511, 513 configured to determine the position of the antenna structure. Further, at least one the decoder systems 506,516 may comprise a positioning module 526 that is arranged to receive positioning information from the GPS units 507, 509,511,513 and to determine one or more relative positions between each portable vertically-oriented antenna structure. The positioning module 526 may be connected to a graphical user interface 528 that is configured to display positions of portable vertically-oriented antenna structures 532 connected to the decoder system 502 and, optionally, the positions of portable vertically-oriented antenna structures 530 connected to one or more other decoder systems 516. Based on these positions relative distances between the different antenna structures can be determined and displayed. Further, in an embodiment, a graphical indication of the radiation field of each of antenna elements may be displayed by the graphical user interface. The decoder may be configured to control the output power of antennas, which can be used to control the size of the radiation field. Hence, the position information that is displayed to the user may be used to install and positions the side antennas of one or more UHF timing systems so that the timing system will perform according to the specifications.

FIG. 6A-6C schematically depicts a portable RF antenna structure according to another embodiment of the invention. The portable RF antenna structure in this figure is a variant of the structure described with reference to FIG. 2A-2E. Instead of a foldable antenna structure, this embodiment represents a modular vertical antenna structure comprising a base structure 602 and planar antenna units 604-608, wherein the planar antenna units 604-608 are configured to be stacked on top of each other. In this embodiment, the portable RF antenna structure may be configured to have an assembled configuration and a disassembled configuration.

As shown in FIG. 6A, the portable RF antenna structure may include three modular antenna units 604-608 wherein each antenna unit comprises a planar RF antenna. Further, each antenna unit 604-608 may comprise connecting members on the bottom and top side of the antenna unit. The connecting members are configured so that the first antenna unit 604 can be vertically fixated onto the base structure and the further antenna units 606,608 can be stacked on top of each other. The connection members 614,616 may be configured so that—in the assembled configuration—the antenna units 604-608 are vertically fixated under a predetermined inclination angle (in a similar way as described with reference to FIGS. 1A-1D and 2A-2E). In an embodiment, the connection members 614,616 may include one or more electrical connector for electrically connecting the antennas to an electrical bus, e.g. a CAN bus.

The base structure 602 may be configured as a housing for housing the modular antenna structures in the disassembled configuration. In that case, the individual modular antenna units 604-608 of the portable RF antenna structure may be horizontally stacked in the housing (comparable to FIG. 2E) which is configured to form the base of the portable RF antenna structure in the assembled configuration.

FIGS. 7A and 7B schematically depicts a portable RF antenna structure according to a further embodiment of the invention. In this example, the portable RF antenna structure may be a foldable antenna structure as described with reference to FIGS. 2A-2E or a modular antenna structure as described with reference to FIG. 6A-6C. In this embodiment, the antenna structure may comprise one or more further units, e.g. a camera unit 708 comprising one or more camera's 710,712. The camera unit 708 may be controlled by a processor in the decoder system. In an embodiment, if the decoder system detects passing tags, it may trigger the camera unit 708 to start capturing video of the passing participants, which may be stored in the memory of the decoder system or wirelessly transmitted via the wireless interface to a media server. In an embodiment, each portable RF antenna structure may have one or more camera's 710,712. On the basis of multiple video clips taken from different camera positions a 3D video clip may be determined. Such 3D video clip provides information on the position of the passing participants as a function of time. This information may be used in combination with the passing time that is determined on the basis of the tag signal.

Alternatively and/or in addition, in an embodiment, the antenna structure may comprise a display unit. The display unit may display passing times and tag numbers of passing participants as determined by the timing system.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. For example, the invention is not limited to the use in sporting events and may also be applied in other areas, e.g. tag for use with animals.

What is claimed is:

1. A free-standing portable foldable RF side antenna structure for a UHF timing system comprising:
   a base structure;
   a first antenna unit comprising a first planar RF antenna and a second antenna unit comprising a second planar RF antenna, the first antenna unit and second antenna unit being connected to the base structure;
   the base structure, the first antenna unit and the second antenna unit being configured as a foldable RF side antenna structure;
   the foldable RF side antenna structure having a folded antenna configuration wherein the base structure forms a housing structure to house the first antenna unit and second antenna unit, the base structure housing the first antenna unit and the second antenna unit only in the folded antenna configuration; and,
   the foldable RF side antenna structure having an unfolded antenna configuration wherein:
   the base structure is configured to be positioned on a horizontal surface to keep the first antenna unit and the second antenna unit in a substantially upright orientation with respected to the horizontal surface; and, a main axis of a first radiation field of the first planar RF antenna and the horizontal surface defining a first inclination angle between 10 and 50 degrees; and a main axis of a second radiation field of the second planar RF antenna and the horizontal surface defining a second inclination angle between −20 and 20 degrees.

2. The antenna structure according to claim 1 wherein the second antenna unit is positioned above the first antenna unit.

3. The antenna structure according to claim 1 wherein the second antenna unit is positioned next to the first antenna unit.

4. The antenna structure according to claim 1 wherein the main axis of the first radiation field of the first planar RF antenna is normal to a first surface of the first planar RF antenna; and/or, wherein the main axis of the second radiation field of the second planar RF antenna is normal to a second surface of the second planar RF antenna.

5. The antenna structure according to claim 1 wherein the first planar RF antenna and/or the second planar RF antenna comprises at least one patch antenna.

6. The antenna structure according to claim 1 wherein the first antenna unit and second antenna unit have a substantially rectangular shape.

7. The antenna structure according to claim 1 wherein the first antenna unit is pivotally connected to the base structure by a first pivotable connection and wherein the first antenna unit is further pivotally connected to the second antenna unit by a second pivotable connection.

8. The antenna structure according to claim 7 wherein the first and second pivotable connection are configured to position the first and second antenna unit in the folded antenna configuration and in the unfolded upright antenna configuration respectively; wherein in the folded antenna configuration a first planar surface of the first planar RF antenna faces a first planar surface of the second planar RF antenna.

9. The antenna structure according to claim 1 wherein the first and second antenna unit form a modular RF antenna structure, the antenna structure having an assembled configuration and a disassembled configuration, the base structure forming a housing structure configured to house the first and second antenna unit in the disassembled configuration.

10. The antenna structure according to claim 9 wherein the first and second antenna unit comprise connecting members configured to fixate the first antenna unit to the base structure and to fixate the second antenna unit to the first antenna unit.

11. The antenna structure according to claim 1 further comprising one or more camera units; and/or, one or more display units; and/or, a GPS unit.

12. The antenna structure according to claim 1 and at least one decoder system connected to at least one of the first and second planar RF antennas.

13. A free-standing portable foldable RF side antenna structure for a UHF timing system, the foldable RF antenna structure configured to be in a folded antenna configuration and an unfolded vertically-oriented antenna configuration, the antenna structure comprising:

a base structure arranged to support the unfolded vertically-oriented antenna configuration on a substantially horizontal surface;

wherein the unfolded vertically-oriented antenna configuration comprises at least a first planar RF antenna unit and a second planar RF antenna unit, the first planar RF antenna unit and second planar RF antenna unit being vertically-oriented with respected to the horizontal surface; and wherein the base structure further is arranged as a housing for housing the first planar RF antenna unit and the second planar RF antenna unit in only the folded antenna configuration.

14. The antenna structure according to claim 13 wherein the first planar RF antenna unit is pivotally connected to the base structure by a first pivotable connection, the first planar RF antenna unit further being pivotally connected to the second planar RF antenna unit by a second pivotable connection; the first and second pivotable connection being configured to position the first and second planar RF antenna units in the folded antenna configuration and in the unfolded vertically-oriented antenna configuration respectively.

15. The antenna structure according to claim 13 wherein in the folded antenna configuration a first planar surface of the first planar RF antenna unit faces a first planar surface of the second planar RF antenna unit and wherein in the unfolded vertically-oriented antenna configuration a first main axis of the first planar RF antenna unit makes a first inclination angle with the horizontal surface and a second main axis of the second planar RF antenna unit makes a second inclination angle with the horizontal surface.

16. A free-standing portable RF side antenna structure for a UHF timing system, the antenna structure comprising:

a first planar RF antenna unit and a second planar RF antenna unit; and a base structure coupled to the first planar RF antenna unit and arranged to support the first planar RF antenna unit and the second planar RF antenna unit in an upright, vertically oriented configuration relative to a horizontal surface, the base structure including a recess configured to receive the first planar RF antenna unit and the second planar RF antenna unit as a stacked assembly, each of the first planar RF antenna unit and the second planar RF antenna unit having a position relative to the base structure in the stacked assembly different than in the upright, vertically oriented configuration.

17. The antenna structure according to claim 16, wherein in the upright, vertically oriented configuration a main axis of a first radiation field of the first planar RF antenna unit and the horizontal surface define a first inclination angle between 10 and 50 degrees; and a main axis of a second radiation field of the second planar RF antenna unit and the horizontal surface define a second inclination angle between −20 and 20 degrees.

18. The antenna structure according to claim 16 wherein in the upright, vertically oriented configuration the second planar RF antenna unit is positioned above the first planar RF antenna unit.

19. The antenna structure according to claim 16 wherein the first planar RF antenna unit is pivotally connected to the base structure by a first pivotable connection and wherein the first planar RF antenna unit is further pivotally connected to the second planar RF antenna unit by a second pivotable connection.

20. The antenna structure according to claim 16 wherein the first planar RF antenna unit and the second planar RF antenna unit form a modular RF antenna structure, the modular RF antenna structure having an assembled configuration corresponding to the upright, vertically oriented configuration, and a disassembled configuration configured for forming the stacked assembly.

* * * * *